United States Patent
Onita et al.

(10) Patent No.: US 9,127,746 B2
(45) Date of Patent: Sep. 8, 2015

(54) POWER TRANSMISSION BELT AND METHOD OF MAKING A POWER TRANSMISSION BELT

(75) Inventors: Takafumi Onita, Fukuchiyama (JP); Akihiro Nagata, Fukuchiyama (JP)

(73) Assignee: Mitsuboshi Belting Ltd. (JP)

( * ) Notice: Subject to any disclaimer, the term of this patent is extended or adjusted under 35 U.S.C. 154(b) by 200 days.

(21) Appl. No.: 13/153,524

(22) Filed: Jun. 6, 2011

(65) Prior Publication Data

US 2011/0237375 A1    Sep. 29, 2011

Related U.S. Application Data

(62) Division of application No. 11/488,234, filed on Jul. 18, 2006, now Pat. No. 8,002,922.

(30) Foreign Application Priority Data

Jul. 19, 2005 (JP) ................. 2005/208142
Jul. 22, 2005 (JP) ................. 2005/212205

(51) Int. Cl.
F16H 7/00 (2006.01)
F16G 1/26 (2006.01)
F16G 5/20 (2006.01)

(52) U.S. Cl.
CPC ..................... F16G 5/20 (2013.01)

(58) Field of Classification Search
USPC ......... 474/153, 154, 204, 205, 237, 238, 250, 474/260, 261, 263, 264, 266, 271
See application file for complete search history.

(56) References Cited

U.S. PATENT DOCUMENTS

| | | | | |
|---|---|---|---|---|
| 4,445,879 A * | 5/1984 | Cicognani | ...................... | 474/205 |
| 4,559,029 A * | 12/1985 | Miranti et al. | ................ | 474/205 |
| 6,620,068 B2 * | 9/2003 | Ito et al. | ......................... | 474/205 |
| 6,962,639 B2 * | 11/2005 | Ito et al. | ......................... | 156/139 |
| 8,002,659 B2 * | 8/2011 | Ichiba | ........................... | 474/237 |
| 8,002,922 B2 * | 8/2011 | Onita et al. | .................... | 474/205 |
| 8,142,316 B2 * | 3/2012 | Goettsch et al. | .............. | 474/260 |
| 2007/0023127 A1 * | 2/2007 | Onita et al. | .................... | 474/237 |
| 2010/0216583 A1 * | 8/2010 | Westelaken | .................... | 474/238 |

* cited by examiner

*Primary Examiner* — William A Rivera
(74) *Attorney, Agent, or Firm* — Wood, Phillips, Katz, Clark & Mortimer

(57) ABSTRACT

A power transmission belt having a body with an inside, an outside, and a length. The body has a tension section and a compression section, and teeth and troughs alternating lengthwise of the body. A layer on the body in which the teeth are formed has a surface facing in one of an inside and outside direction on which alternating protrusions and recesses are formed against which another component on the body is placed and conforms.

20 Claims, 7 Drawing Sheets

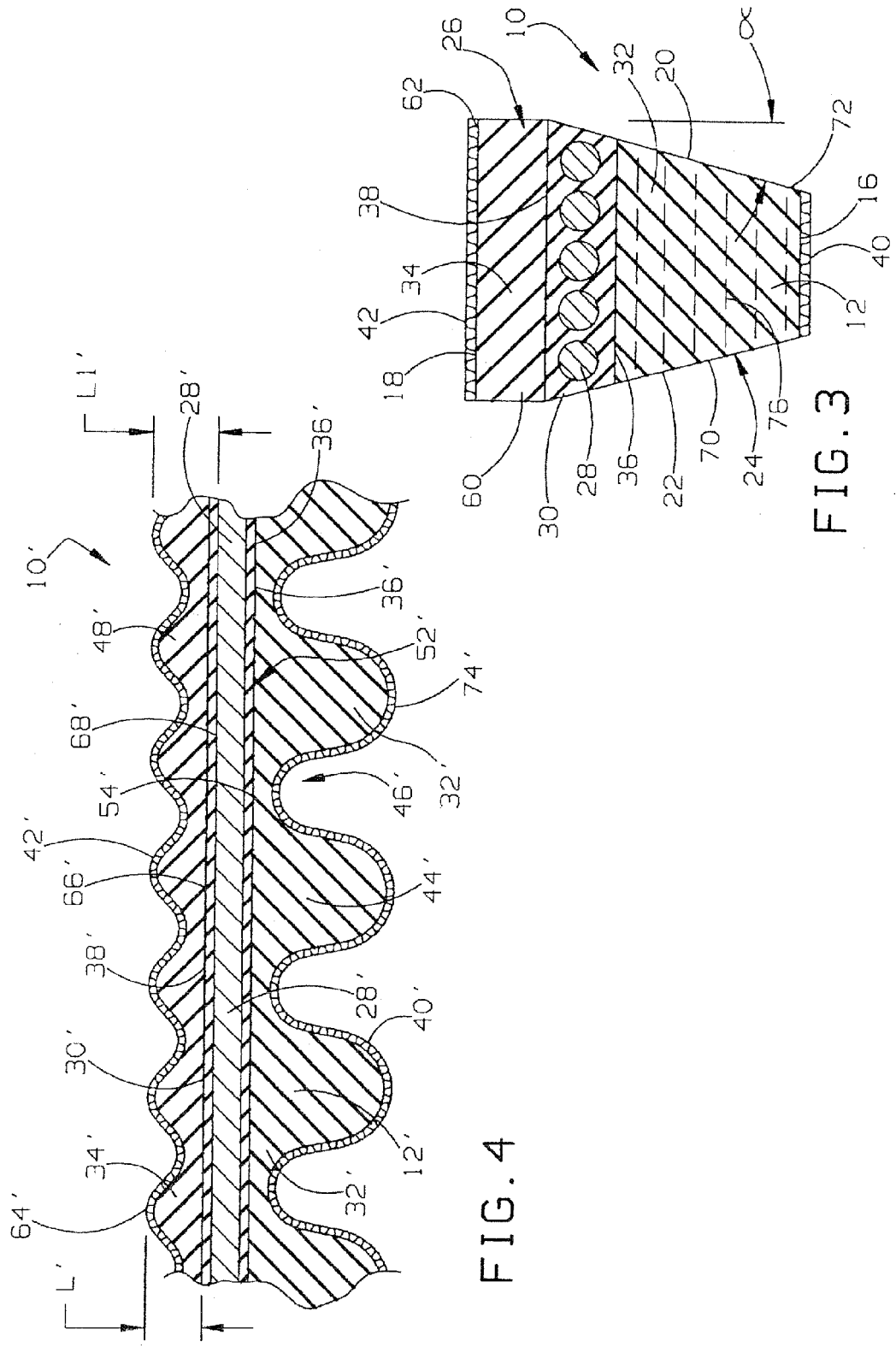

POWER TRANSMISSION BELT AND METHOD OF MAKING A POWER TRANSMISSION BELT

CROSS-REFERENCE TO RELATED APPLICATIONS

This application is a divisional of U.S. patent application Ser. No. 11/488,234 filed Jul. 18, 2006.

BACKGROUND OF THE INVENTION

1. Field of the Invention

This invention relates to power transmission belts and, more particularly, to a power transmission belt having teeth spaced at regular intervals along the length of the belt. The invention is also directed to a method of making such a belt.

2. Background Art

Power transmission belts with drive teeth are used in many different environments. Belts of this type are also referred to as cogged belts and are used commonly as part of a gear shifting mechanism on a snowmobile or scooter, or in other general industrial applications.

In gear shifting mechanisms, these belts are wrapped around driving and driven pulleys. The pulleys are reconfigurable to vary their effective diameter, whereby speed changes can be effected. The belts used in this application are either single- or double-cogged in construction. That is, the belts have inside and outside surfaces with teeth/cogs on one or both of these surfaces. The teeth are spaced at regular intervals along the length off the belt body, with troughs defined between adjacent teeth. The belts of this type are normally made with compression and tension rubber layers between which a cushion rubber layer is provided and in which a load carrying member, such as an elongate cord, is embedded. Typically, the sides of the belts will not be covered by any type of fabric. This type of belt is referred to as a "raw edge" type belt.

There are a number of different methods by which belts of this type are made. In one form, a cylindrical shaping die/mold is used, upon which belt components are serially applied. In one exemplary belt construction, the first component placed upon the shaping die/mold is an outer reinforcing cloth layer, followed by a rubber sheet defining the tension rubber layer, a load carrying member/cord, a rubber sheet defining the compression rubber layer, and an inner reinforcing cloth layer. A cylindrical sleeve, having alternating protrusions and grooves around an inner circumferential surface thereon, is placed surroundingly over the components built up upon the shaping die/mold. Vulcanization is then carried out under controlled pressure and temperature conditions. During vulcanization, the inner reinforcing cloth layer is contracted to thereby emboss the rubber sheet defining the compression rubber layer. One problem with this type of construction is that the belts tend to expand. To avoid this problem, an alternative manufacturing method has been used.

In this alternative method, a rubber sheet/layer is placed against a planar shaping die/mold having alternating projections/recesses extending along the length thereof. The projections/recesses are complementary to the desired end shape of the teeth and troughs on the belt compression section. The shaping die/mold has a length greater than the length of the belt to be made. The rubber sheet/layer is pressed against the shaping die/mold under controlled temperature and pressure conditions to cause the sheet/layer to conform to the projections/recesses on the shaping die/mold. A resulting cog pad is then separated from the shaping die/mold and wrapped around a cylindrical die/mold having a peripheral surface with projections/recesses complementary to the teeth and troughs on the cog pad. The cog pad is wrapped into a continuous shape around the cylindrical die/mold and its complementarily-shaped ends butt joined. One or more load carrying members are then wrapped around the cog pad, followed successively by another rubber layer and a reinforcing cloth layer, to define a sleeve preform that is subsequently vulcanized. Further details of a process of this type are set forth in JP 2002-1691 A.

In yet another method of making belts of the above type, a cylindrical shaping die/mold is utilized. A reinforcing cloth layer and rubber sheet, defining a compression rubber layer, are wrapped around the shaping die/mold, that has projections/recesses that are complementary to the alternating teeth and troughs of a completed belt. After these two components are put in place, a jacket is placed surroundingly over the shaping die/mold. Thereafter, the compression rubber layer is pressed against the shaping die/mold under controlled temperature and pressure conditions to form an unvulcanized sleeve with teeth and troughs complementary to the projections/recesses on the shaping die/mold.

On the back surface of the unvulcanized sleeve, consisting of the cloth and rubber layers, discrete holes tend to generate. That is, as the rubber layer is forced into the recesses, the rubber at the teeth tends to fold inwardly to create discrete gaps or indentations, hereinafter referred to as "discrete holes". As subsequent components are built up upon the shaping die/mold, the discrete holes become fully surrounded and ultimately remain intact on the completed belt. These discrete holes serve as locations at which cracks are prone to being generated as the belt is operated.

One solution, that eliminates these discrete holes, is disclosed in JP 2005-54851 A. In this document, it is described that the discrete holes can be eliminated by cutting, grinding, or polishing the rubber layer at the surface having the discrete holes, to thereby eliminate the same preparatory to applying the next layer. Thereafter, the layers, such as a cushion rubber layer, load carrying member/cord, separate rubber sheet/layer defining the tension section, etc., are successively wrapped to complete a sleeve preform preparatory to vulcanization. While the cutting, grinding, and/or polishing processes may effectively eliminate the discrete holes, these processes generally generate a significant amount of scrap in the form of cutting chips, grinding chips, or polishing chips. For convenience, and environmental purposes, it is desirable to avoid the generation of this type of scrap.

SUMMARY OF THE INVENTION

In one form, the invention is directed to a method of forming a power transmission belt having a body with an inside and an outside and a length. The method includes the steps of: providing a first layer made from rubber and having first and second oppositely facing sides; providing a mold; pressing the first side of the first layer against a surface on the mold having projections and recesses alternating in a lengthwise direction along the first layer and thereby causing the first layer to conform to the mold surface to thereby form alternating teeth and troughs on the first layer that are complementary to the recesses and projections on the mold; locally pressing the second side of the first layer at locations coinciding lengthwise with the teeth to thereby eliminate or prevent the formation of discrete holes, of the type at which cracks are prone to being generated, due to the conforming of the first layer to the recesses; and joining the first layer, having the alternating teeth and troughs thereon, to at least one other component to define the power transmission belt.

The method may further include the step of providing a first member with a first surface having protrusions and recesses. The steps of pressing the first layer against a mold surface and locally pressing the first layer may be carried out at the same time by pressing the first surface against the second side of the first layer.

The step of providing a first member may involve providing a first member with the protrusions and recesses that alternate lengthwise with respect to the first layer.

The teeth have a lengthwise dimension. The step of providing a first member may involve providing a first member with a first surface having protrusions each with a lengthwise dimension that is substantially less than the lengthwise dimension of the teeth.

The power transmission belt has a tension section and a compression section. In one form, the step of joining the first layer involves joining the first layer with a load carrying member and a second layer so that the first layer defines at least a part of the compression section, the second layer defines at least a part of the tension section, and the load carrying member resides between the first and second layers.

The step of joining the first layer may involve joining the first layer with a cushion rubber layer within which the load carrying member is embedded.

The method may further include the step of heating the first layer as the first layer is pressed against the mold surface.

In one form, the step of joining the first layer involves placing a cushion rubber layer against a second side of the first layer after pressing the first layer against a mold surface and locally pressing the first layer, applying a load carrying member against the cushion rubber layer and thereafter applying a tension rubber layer to define a preform, and vulcanizing the preform through controlled heating and pressurization.

The step of providing a mold may involve providing a mold wherein the mold surface extends continuously around an axis. The method may further include the step of wrapping the first layer around the mold surface in a cylindrical shape preparatory to performing the step of locally pressing the first layer.

In one form, the step of locally pressing the first layer involves locally pressing the first layer so that the second side of the first layer is shaped with protrusions and recesses that are complementary, and conform, to the protrusions and recesses on the first surface of the first member.

The step of locally pressing may be carried out after the alternating teeth and troughs are formed in the first layer.

The method may further include the step of providing a first member with a first surface having protrusions and recesses that is pressed against the second side of the first layer.

The step of locally pressing the first layer may involve locally pressing the first layer so as to eliminate discrete holes formed during the step of defining the alternating teeth and troughs.

The step of joining the first layer may involve joining the first layer after locally pressing the first layer.

The step of locally pressing the first layer may involve locally pressing the first layer with at least one of the at least one other component.

In one form, the step of locally pressing the first layer involves locally pressing the first layer with at least one of the at least one other component having a surface with protrusions and recesses that is pressed against the second side of the first layer.

The step of locally pressing the first layer may involve locally pressing the first layer with a cushion rubber layer having a surface with protrusions and recesses, with the step of joining the first layer involving joining the first layer with a load carrying member that is embedded in the cushion rubber layer.

The method may further include the step of separating the first member from the first layer before the step of joining the first layer to at least one other component. The step of joining the first layer may involve joining the first layer with a load carrying member and a second layer after the first layer is shaped to conform to the protrusions and recesses on the first surface of the first member so that: the power transmission belt has a tension section and a compression section; the first layer defines at least part of the compression section; the second layer defines at least a part of the tension section; and the load carrying member resides between the first and second layers.

The teeth and troughs may be formed at the inside of the belt body, with the step of joining the first layer involving joining the first layer to at least one other layer in which teeth are formed on the outside of the belt body.

The step of providing a first member may involve providing a first member with a first surface having protrusions and recesses with the protrusions having a dimension between the inside and outside of the body between 0.2 and 2.5 mm.

The method may further include the step of reducing a dimension of the protrusions on the second side of the first layer.

The step of reducing a dimension of the protrusions on the second side of the first layer may involve reducing a dimension of the protrusions without removing material from the first layer.

The step of reducing the dimension of the protrusions on the second side of the first layer may involve placing a member under pressure against the second side of the first layer.

The invention is further directed to a power transmission belt having a body with an inside, an outside, and a length. The body defines a tension section and a compression section. The body has teeth and troughs alternating lengthwise of the body. A layer on the body in which the teeth are formed has a surface facing in one of an inside and outside direction on which alternating protrusions and recesses are formed and against which another component on the body is placed and conforms.

In one form, the teeth have a lengthwise dimension and the protrusions have a lengthwise dimension that is substantially less than the lengthwise dimension of the teeth.

The protrusions may have a dimension between the inside and outside of the body between 0.2 and 2.5 mm.

In one form, the another component is a cushion rubber layer in which a load carrying member is embedded.

The teeth may be formed in the compression section.

In one form, there are teeth and troughs alternating in a lengthwise direction and formed in the tension section.

The invention is further directed to a power transmission belt having a body with an inside, an outside, and a length. The body has a tension section and a compression section. The body has teeth and troughs alternating lengthwise of the body. A layer on the body has oppositely facing first and second surfaces. Teeth and troughs are formed at the first surface by applying pressure to the layer against a mold surface to cause the first surface to conform to a mold surface that has a shape complementary to the teeth and troughs. The body further has a component that is placed directly against the second surface of the layer. The second surface on the first layer does not have any discrete holes at the teeth, generated by conforming of the first layer to a mold surface, into which the component is directed.

In one form, the component has a cushion rubber layer in which a load carrying member, extending lengthwise of the body, is embedded.

In one form, the teeth are in the compression section.

The second surface on the first layer may have alternating protrusions and recesses to which the component conforms.

In one form, the teeth have a lengthwise dimension and the protrusions have a lengthwise dimension that is substantially less than the lengthwise dimension of the teeth.

In one form, the protrusions have a dimension between the inside and outside of the body between 0.2 and 2.5 mm.

BRIEF DESCRIPTION OF THE DRAWINGS

FIG. 3 is a cross-sectional view of the belt taken along lines 3-3 of FIG. 2;

FIG. 4 is a view as in FIG. 5 of another form of power transmission belt, made according to the present invention;

DETAILED DESCRIPTION OF THE DRAWINGS

Figure 1:
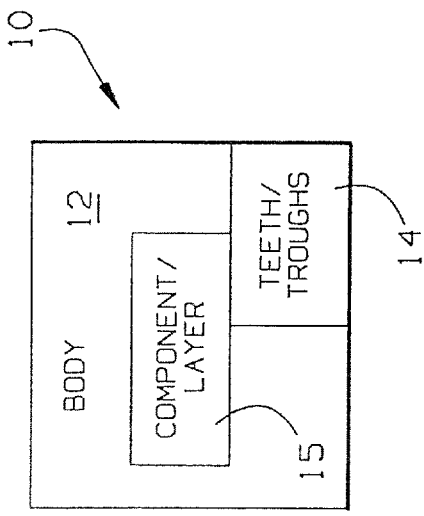
FIG. 1 is a schematic representation of a power transmission belt, made according to the present invention.

Referring initially to FIG. 1, the invention is directed to a power transmission belt at 10 consisting of an endless body 12 having teeth/troughs 14 alternating along the entire length thereof. The teeth/troughs 14 can be on the inside and/or the outside of the body 12. Essentially, the invention can be practiced with any belt in which the teeth/troughs 14 are formed in a layer that is joined to another component/layer 15 that is used to define the body 12. The specific embodiments described below are exemplary in form only and not intended to be limiting of the broad concepts disclosed herein.

Figure 2:
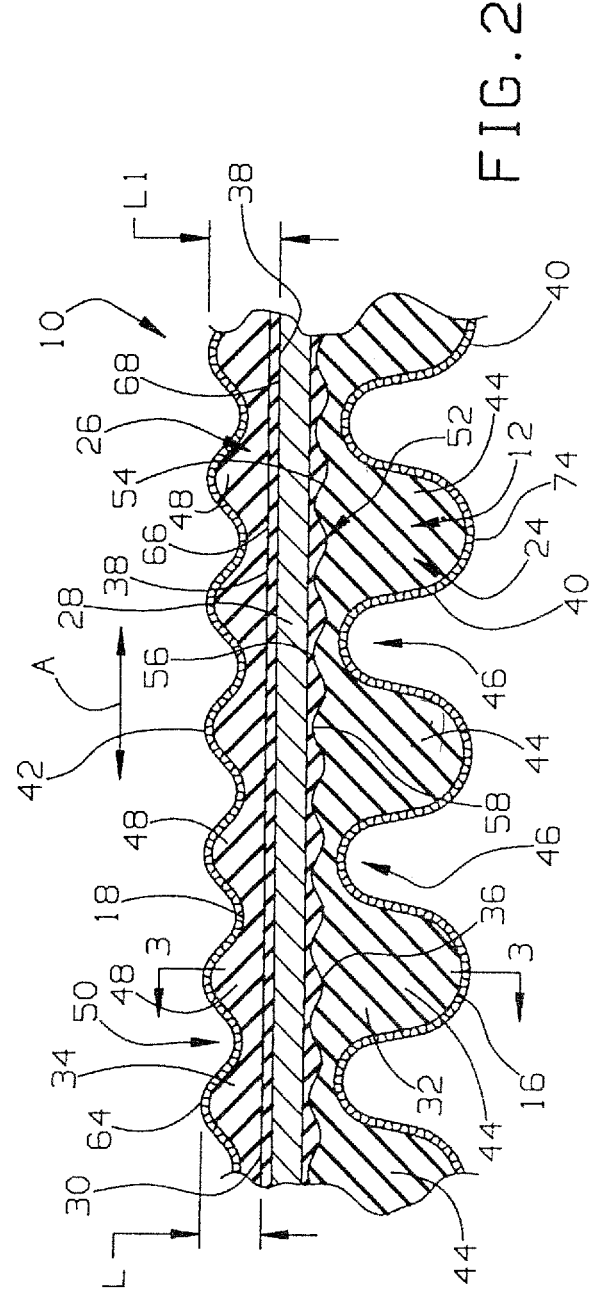
FIG. 2 is a lengthwise cross-sectional view of one form of power transmission belt, made according to the present invention.

In FIGS. 2 and 3, one specific form of the power transmission belt 10 is shown in greater detail. The body 12 of the power transmission belt 10 extends endlessly in a lengthwise direction, as indicated by the double-headed arrow A. The body 12 has an inside 16, an outside 18, and laterally oppositely facing sides 20, 22. The body 12 defines an inside compression section 24 and an outside tension section 26 between which a load carrying member, in the form of a spirally wrapped, load carrying cord 28, resides. The load carrying cord 28 is embedded in a cushion rubber layer 30, that resides between a first rubber layer 32 defining the compression section 24, and a second rubber layer 34 defining the tension section 26. The cushion rubber layer 30 may actually be defined by separate, inner and outer layer portions 36, 38 between, and within, which the load carrying cord 28 is embedded. Reinforcing cloth layers 40, 42 are respectively applied to the inside 16 and outside 18 of the body 12.

Teeth 44 are provided at regularly spaced intervals along the length of the body 12, with there being troughs 46 between adjacent teeth 44 so that the teeth 44 and troughs 46 alternate along the entire length of the body 12. Teeth 48 are also formed in the tension section 26 at regularly spaced intervals. Troughs 50 are provided between adjacent teeth 48 so that the teeth 48 and troughs 50 likewise alternate along the length of the body 12. The teeth 48 have a shorter pitch than the teeth 44 and are shallower in dimension in a direction between the inside and outside of the body 12.

At an interface 52 between the first rubber layer 32 and the inner layer portion 36 of the cushion rubber layer 30, the outwardly facing surface 54 of the first rubber layer 32 has a non-flat shape with alternating protrusions 56 and recesses 58 pre-formed thereat through pressure application to which the inner layer portion 36 conforms. The protrusions 56 and recesses 58 are present at least where the teeth 44 reside. Preferably, this pattern of protrusions 56 and recesses 58 recurs over the entire lengthwise extent of the body 12 and produces a sinusoidal shape for the surface 54. The protrusions 56 and recesses 58 are configured so that a plurality of protrusions 56 and a plurality of recesses 58 align lengthwise over each of the teeth 44. The inner layer portion 36 fills any voids, such as discrete holes, that may be generated during the belt forming process. By eliminating these discrete holes, they do not remain as locations at which there is a localized stress and at which cracks are prone to being generated during belt operation.

A modified form of power transmission belt, according to the present invention, is shown at 10' in FIG. 4. The belt 10' has a similar construction to that of the belt 10, with like components, with the exception that at the interface 52' between the first rubber layer 32' and the inner layer portion 36' of the cushion rubber layer 30', the outwardly facing surface 54', to which the cushion rubber 30' conforms, is substantially flat, with shallower, or substantially no, corresponding protrusions/recesses over the entire length of the body 12'. The inner layer portion 36' thus does not extend into the teeth 44' within any significant voids. The teeth 44' and troughs 46' alternate over the entire length of the body 12'. As a consequence, the inner layer portion 36' has a substantially uniform thickness between the inside and outside of the body 12' over substantially the entire length of the body 12'. As explained in detail below, any voids are filled with the rubber from the first rubber layer 32' to eliminate voids that might otherwise cause a stress concentration at locations at which cracks are prone to being generated as the belt 10' is operated.

With each belt constructions shown in FIGS. 2 and 4, oppositely facing side surface portions 60, 62 (shown only in FIG. 3 for belt 10) are substantially parallel over a distance L, L', corresponding to the distances between the apices 64, 64' of the teeth 48, 48' and the outside surfaces 66, 66' of the outer layer portions 38, 38' of the cushion rubber layers 30, 30'. The distances L, L' are equal to 90 to 100 percent of the distances L1, L1', between the apices 64, 64' and the outsides 68, 68' of the load carrying cords 28, 28'. The side surface portions 70, 72 extending between the outside surfaces 66, 66' and apexes 74, 74' of the teeth 44, 44' are bias cut at an angle α (FIG. 3). The angle α is preferably between 20 and 60°. The invention also contemplates a wide angle belt. It is further possible for the entire dimension of the belt bodies 12, 12', between the insides and outsides thereof, to have side surfaces that are fully bias cut.

The load carrying cords 28, 28' may be made from one or more of polyester fiber, aramid fiber, glass fiber, or the like. In one preferred form, the load carrying cords 28, 28' are made by twisting together polyester fiber filament groups having a main component of ethylene-2 and 6-naphthalate. The cords 28, 28' each preferably have a total denier of 4,000 to 8,000 and are adhesion treated. The load carrying cords 28, 28' of this construction tend to account for a reduced belt slippage ratio and contribute to long service life. In one preferred form, the upper twist number for these cords is 10 to 23 per 10 cm, with the lower twist number being 17 to 38 per 10 cm.

When the total denier of the cords 28, 28' is less than 4,000, the modulus and strength of the cords 28, 28' may become too low. On the other hand, when the total denier exceeds 8,000, the overall belt thickness may become undesirably large. The belts incorporating these cords may thus be prone to unwanted flexing fatigue.

The compression rubber layers 32, 32' and the tension rubber layers 34, 34' may be made from rubber materials such as any one, or a mixture, of natural rubber, butyl rubber, styrene-butadiene rubber, chloroprene rubber, ethylene-propylene rubber, alkylated chlorosulfonated polyethylene, hydrogenated nitrile rubber, a composite polymer of hydrogenated nitrile rubber and unsaturated carboxylic metal salt.

Laterally extending, short, reinforcing fibers 76, shown only in FIG. 3 for the belt 10, may be made from aramid fiber, polyamide fiber, polyester fiber, and/or cotton fiber. The length of the fibers 76, which depends upon their constitution, is preferably in the range of 1 to 10 mm. For example, length ranges that are preferred are 3 to 5 mm for aramid fiber, and approximately 5 to 10 mm for each of polyamide fiber, polyester fiber, and cotton. With a reference direction perpendicular to the lengthwise direction of the belt being 90°, most of the fibers 76 are oriented so their lengths are at an angle 70 to 110°. Fibers are optional in both the tension rubber layers 34, 34' and cushion rubber layers, 30, 30'. For purposes of maximizing adhesion between the cushion rubber layers 30, 30' and the load carrying cords 28, 28', it is preferred that there not be fibers in the cushion rubber layers 30, 30'.

The reinforcing cloth layers 40, 40'; 42, 42' may be made from polyester fiber, nylon, etc. The cloth layers 40, 40'; 42, 42' may be made through a weaving process such as plain weaving, twill weaving, or satin weaving. Preferably, the crossing angles of warp and weft yarns are in the range of 90 to 120°. Rubber may be applied through a friction coating process with a rubber composition after RFL treatment.

A suitable RFL liquid for this purpose is obtained by mixing an initial condensate of resorcin and formaldehyde with latex. Examples of suitable latex compositions include chloroprene, a terpolymer of styrene, butadiene, and vinyl pyridine, hydrogenated nitrile, and NBR.

One method of manufacturing the power transmission belts 10, 10' will now be described. While the processes described can be practiced for manufacturing both belts, the description herein will be limited to exemplary belt 10.

Figure 5:
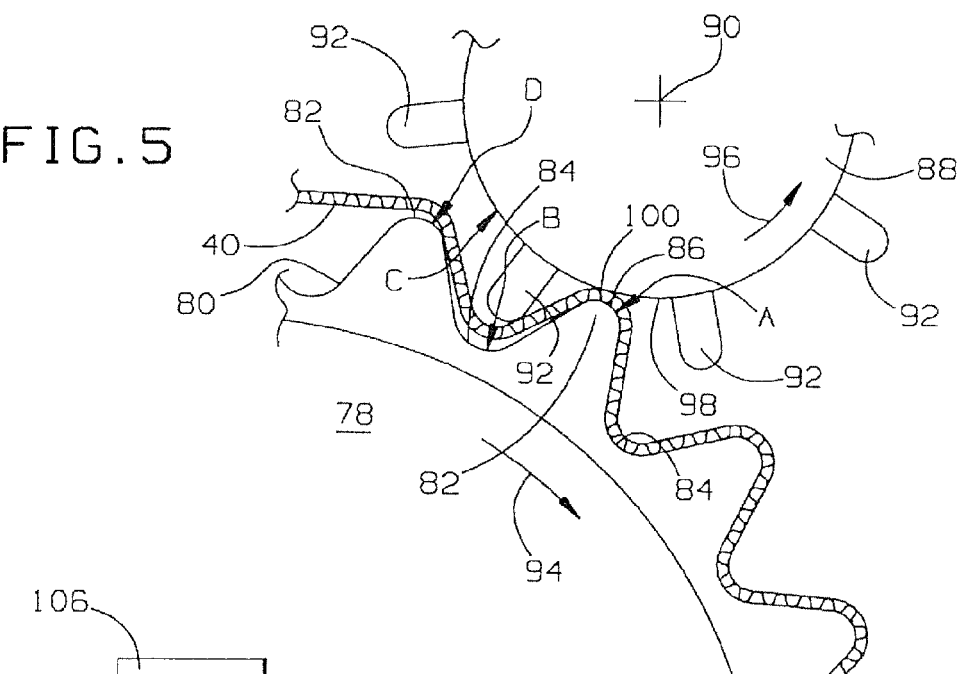
FIG. 5 is a fragmentary, elevation view of a portion of a shaping die/mold, upon which components of a power transmission belt, made according to the present invention, are successively applied, and showing one component, in the form of a reinforcing cloth layer, being directed against a surface on the shaping die/mold.

As seen in FIG. 5, a cylindrical shaping die/mold 78 is used having a peripheral surface 80 with alternating projections 82 and recesses 84 that are complementary in shape to the teeth 44 and troughs 46. A rubber-type adhesive 86, which may be rubber cement, is applied to the peripheral surface 80 at the projections 82, by a spaying mechanism, a brush, a roller, or the like. The reinforcing cloth layer 40, which may be adhesion treated or unprocessed, is drawn and placed against the peripheral surface 80 at the projections 82. A pinion roller 88, having a center axis 90 and radially projecting teeth 92, is lowered to engage the reinforcing cloth layer 40. The teeth 92 are circumferentially spaced to match the spacing of the recesses 84. The pinion roller 88 is situated to align a tooth 92 in one of the recesses 84. By turning the shaping mold 78 in the direction of the arrow 94, the shaping mold 78 and pinion roller 88 mesh and cooperate to cause the pinion roller 88 to pivot in the direction of the arrow 96 about its axis 90. As relative rotation occurs between the shaping mold 78 and pinion roller 88, the teeth 92 are caused to move into and out of successive recesses 84 in the following manner.

As the pinion roller 88 is lowered, a peripheral surface 98 thereon presses the reinforcing cloth layer 40 against the apex 100 of a projection 82 at A with one of the teeth 92 in the adjacent recess 84 at B. As relative rotational movement between the shaping mold 78 and pinion roller 88 occurs from the FIG. 5 position, the active tooth 92 drives the cloth layer 40 to against the peripheral surface 80 within the recess 84 at B, while the cloth layer 40 is held captive between the surface 98 and the adjacent projection 82 at A, thereby to effect deformation under pressure. Thereafter, a following portion of the peripheral surface 98 at C engages the following projection 82 at D, as a consequence of which the cloth layer 40 is caused to be pressed along the entire extent of the surface 80 within the recess 84 without stretching or excessive force application to the cloth layer 40. This process is repeated to thereby cause the cloth layer 40 to be intimately contacted with the entire periphery of the surface 80.

With this embodiment, only one tooth 92 on the pinion roller 88 engages the cloth layer 40 at any one time. As a result, as the active tooth 92 is acting against the cloth layer 40, no other tooth 92 is in contact therewith as might otherwise cause the cloth layer 40 to be stretched or raised. Through repetition of this process, one, or multiple, i.e. four, plies may be applied. The terminal end of the cloth layer 40 is cut off by an appropriate cutter and affixed.

It is not necessary that the cloth layer 40 be applied through a pinion roller 88. As an alternative, it is known to use rods that are adapted to be press fit into corresponding recesses 84.

A suitable adhesive 86 is one made by dissolving various rubber compositions and solvents such as methyl ethyl ketone (MEK) or toluene and mixing them together. This adhesive 86 maintains the cloth layer 40 intimately contacted with the surface 80 over its entire extent.

Figure 6:
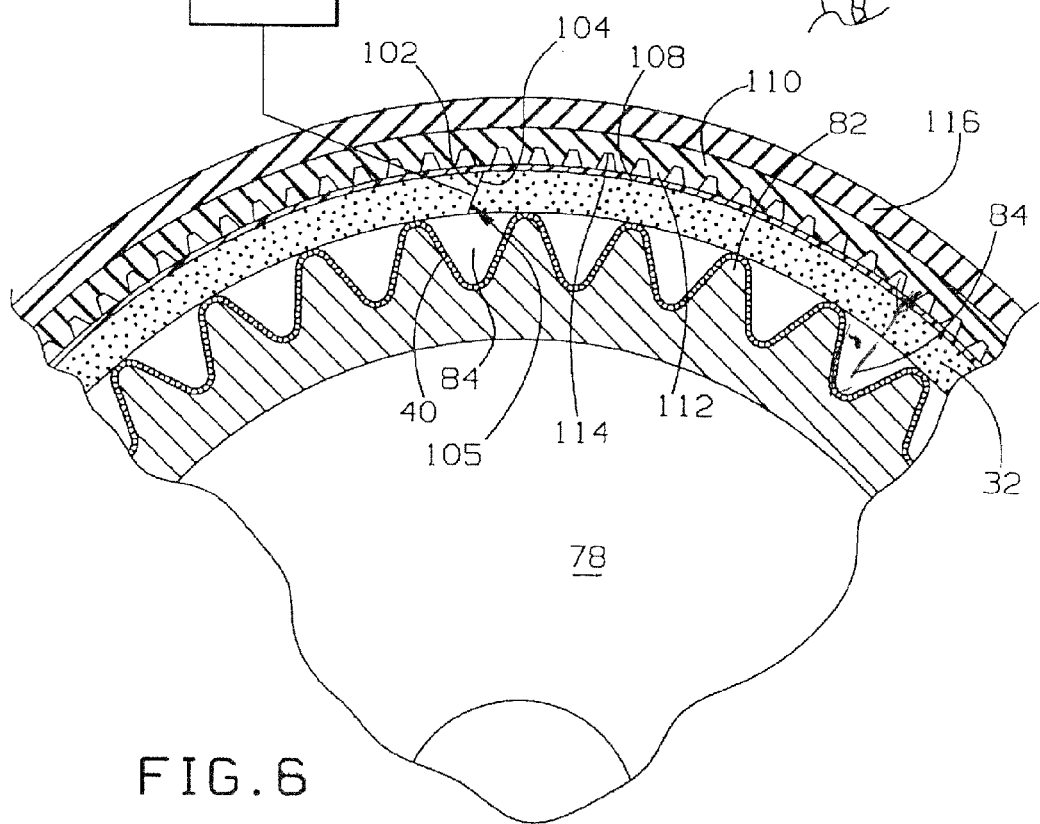
FIG. 6 is a fragmentary, cross-sectional view of the shaping die/mold in FIG. 5, with the reinforcing cloth layer in place and a first rubber layer wrapped therearound, followed by a surrounding shaping member preparatory to forming alternating teeth and troughs by conforming the components to alternating projections and recesses on the circumferential surface of the shaping die/mold.

After the cloth layer 40 is applied, as shown in FIG. 5, the rubber layer 32 defining the compression section 24 is applied as a sheet, as shown in FIG. 6. The sheet/layer 32 is made from rubber that is unvulcanized and has a predetermined thickness. The rubber sheet has ends 102, 104 that are obliquely cut i.e. not perpendicular to the length of the sheet. This is commonly referred to as a bevel cut. With the rubber sheet 32 wrapped around the shaping mold 78 on which the cloth layer 40 is pre-applied, the ends 102, 104 are caused to abut each other at a joint 105. The cut ends 102, 104 are lightly pressured through a jig 106 to secure the joint 105. Heating and pressurization is then carried out to complete the formation of the joint 105 at the ends 102, 104.

Heating and pressurizing may be carried out at a temperature of 80 to 100° C., with a contact pressure of 1 to 2 kg/cm$^2$, for 10 to 30 seconds. The joint 105 is circumferentially located to coincide with one of the recesses 84. If the joint 105 is aligned circumferentially with one of the projections 82, the joint 105 will be located at a trough 46 in the completed belt, whereat it is more likely to be a source of crack generation.

A single ply of a resin film or releasing sheet 108, that has good heat resistance and releasing properties, is wrapped around the rubber layer 32 and bonded thereto. The releasing sheet/layer 108 may be made from polymethyl pentene or polyethylene terephthalate.

The releasing sheet/layer 108 is in turn surrounded by a pressing member 110 having alternating protrusions 112 and recesses 114. The pressing member 110 may consist of a sheet member or be formed as a cylindrical sleeve. That is, the pressing member 110 may be in the form of a toothed belt or a rubber jacket provided with the protrusion and recesses/grooves 114 on the inner surface thereof. The pressing member 110 may alternatively be a cylindrical form with a surrounding rubber jacket 116.

Figure 7:
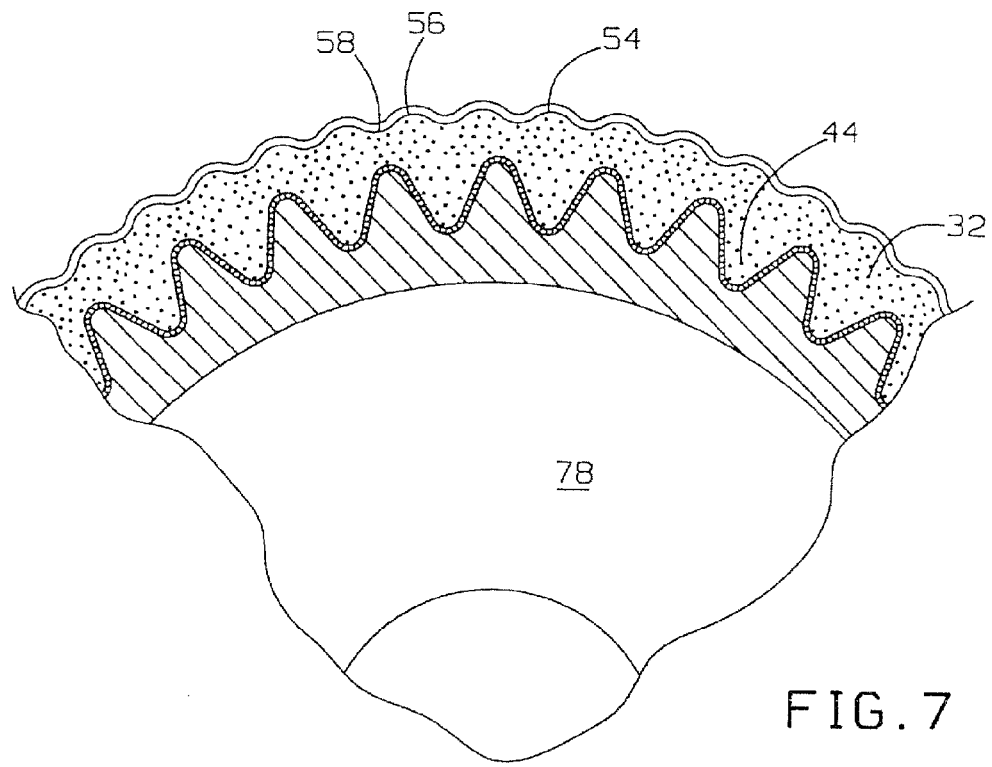
FIG. 7 is a view as in FIG. 6 wherein the first rubber layer has been deformed into the alternating projections and recesses on the shaping die/mold surface to produce the teeth and troughs, and wherein protrusions/recesses are formed on the opposite side of the first layer by the shaping member.

With the components in the FIG. 6 state, an embossment process can be carried out through a vulcanizer. The rubber jacket 116 functions as a steam cut-off member. The shaping mold 78, with the components thereon, is placed in a vulcanizer and processed for approximately 5-10 minutes at a temperature of 160 to 180° C. and an external pressure of 0.1 to 0.9 MPa. The resulting product, with the pressing member 110 and jacket 116 removed, is shown in FIG. 7, with the regularly spaced teeth/cogs 44.

With the process carried out in a vulcanizer, generally no breakage will occur at the joint 105 on the rubber layer 32. The embossment process may be carried out without using a vulcanizer by heating and pressurizing the outside of the rubber layer 32 as by a pressurizing band, a press system, or the like.

When the heated and pressurized rubber layer 32 is caused to flow into the recesses 84, the rubber layer 32 is locally pressed/pressurized by the protrusions 112 on the pressing member 110 so that there are no dents or depressions formed through the outwardly facing surface 54 thereon, as a consequence of which there is little possibility of discrete holes, such as pin holes, being formed of the type at which cracks are prone to being generated. As seen in FIG. 7, the protrusions 112 and recesses 114 on the pressing member 110 produce a complementary pattern of protrusions 56 and recesses 58 at the outwardly facing surface 54 on the rubber layer 32. Certain of the protrusions 112 locally exert a pressure at spaced locations lengthwise between projections 82 on the mold 78. More specifically, the protrusions 112 are spaced around the mold so that one or more protrusions 112 reside between each of the mold projections 82, as seen for example in FIG. 2.

Preferably, the height of the protrusions 56, in a direction between the inside and outside of the belt 10, is 0.2 to 2.5 mm. At this height, there is generally no need to take steps to flatten the outwardly facing surface 54. If the height exceeds 2.5 mm, the surface 54 may have to be flattened. On the other hand, if the height is less than 0.2 mm, the localized pressurization on the surface 54 may not be adequate to effectively eliminate discrete holes.

Figure 8:
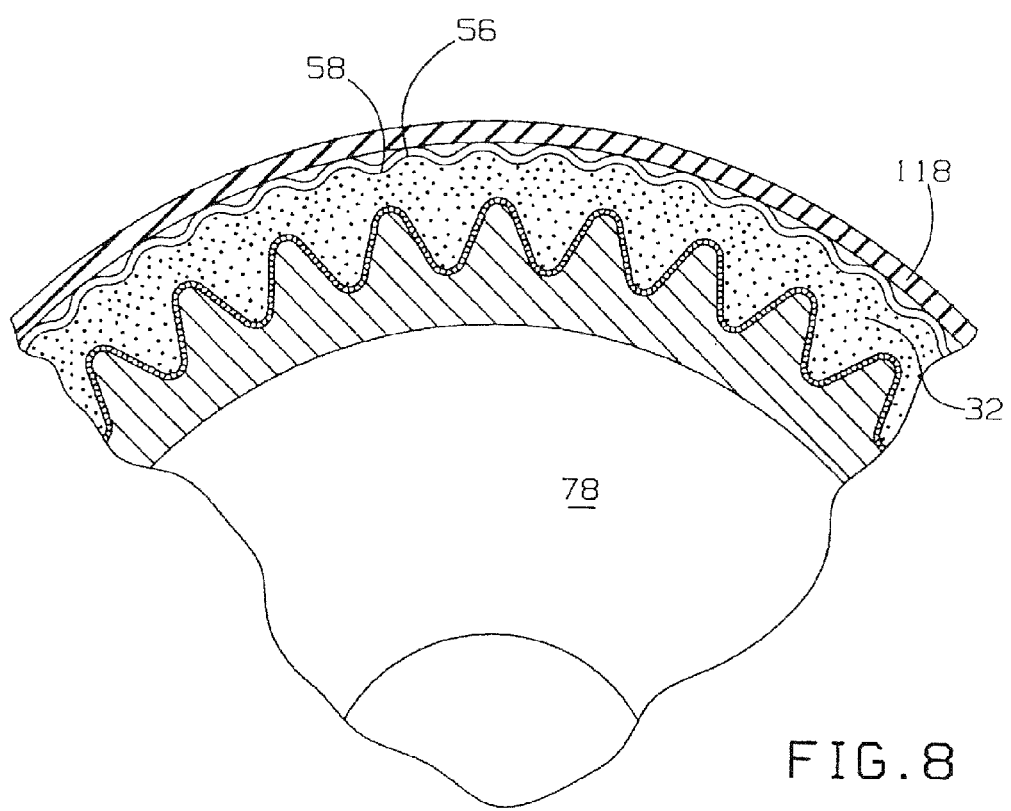
FIG. 8 is a view as in FIG. 7 wherein a member is surroundingly placed over the components in FIG. 7 and pressurized to reduce the dimensions of the protrusions/recesses between the inside and outside of the first rubber layer.

In the event that the height of the protrusions 112 exceeds 2.5 mm, the invention contemplates that flattening can be carried out without removing any of the rubber material on the layer 32. As shown in FIG. 8, the components in the FIG. 7 state may be covered with a cylindrical rubber jacket 118. The components shown in FIG. 8, with the jacket 118 thereon, may then be placed in a vulcanizer and treated for approximately 5-10 minutes at a temperature of 160 to 180° C. and an external pressure of 0.8 to 0.9 MPa. The outwardly facing surface 54 is thus flattened to an acceptable amount, i.e., within the above stated range.

Figure 9:
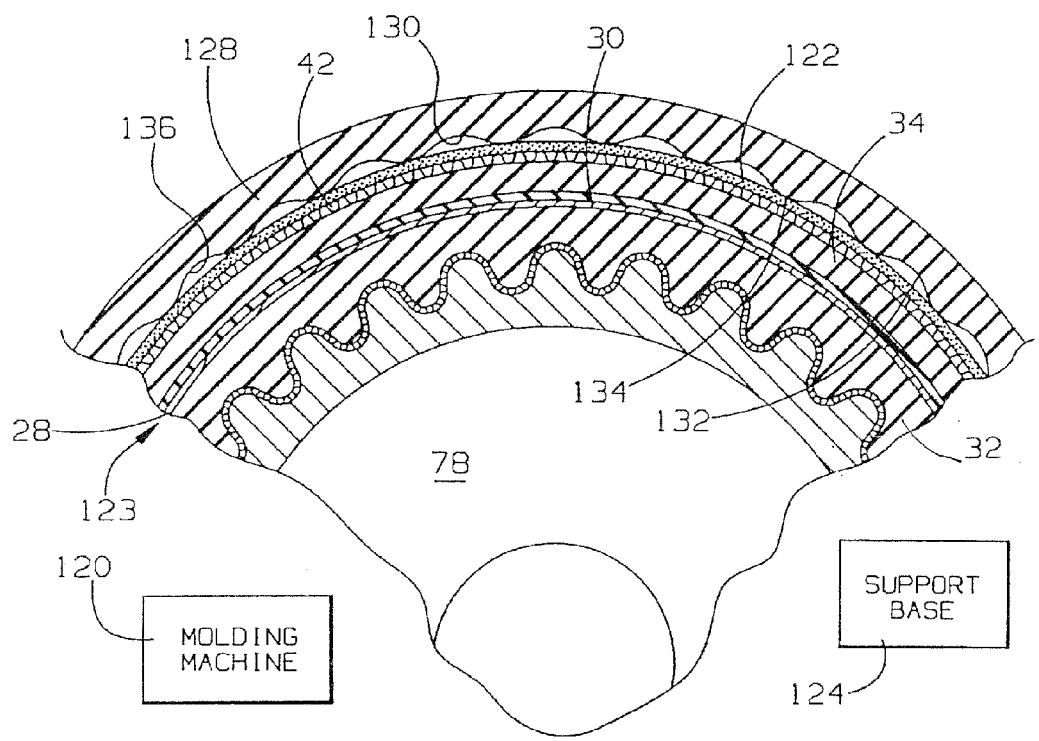
FIG. 9 is a view as in FIG. 8 wherein the remaining belt components are applied.

The invention contemplates that the rubber layer 32, formed either as in FIG. 7 or 8, be joinable with at least one other component to define a power transmission belt. The formed rubber layer 32 is joined with the components to produce the belt 10 as follows. Referring initially to FIG. 9, the shaping mold 78 is attached to a molding machine 120. The load carrying cord 28 is wrapped around the rubber layer 32 in a spiral manner. Thereafter, the cushion rubber sheet/layer 30, rubber layer/sheet 34, reinforcing cloth layer 42 and an air vent member 122 are successively wrapped to define a sleeve preform 123. The shaping mold 78 is then removed from the molding machine 120 and placed on a support base 124. A cylindrical matrix 128 is placed around the preform 123. The cylindrical matrix 128 has a radially inwardly facing surface 130 along which recesses 132 and protrusions 134 are alternatingly formed. The surface 130 is preferably covered with a woven fabric 136 made from nylon, or the like.

Figure 10:
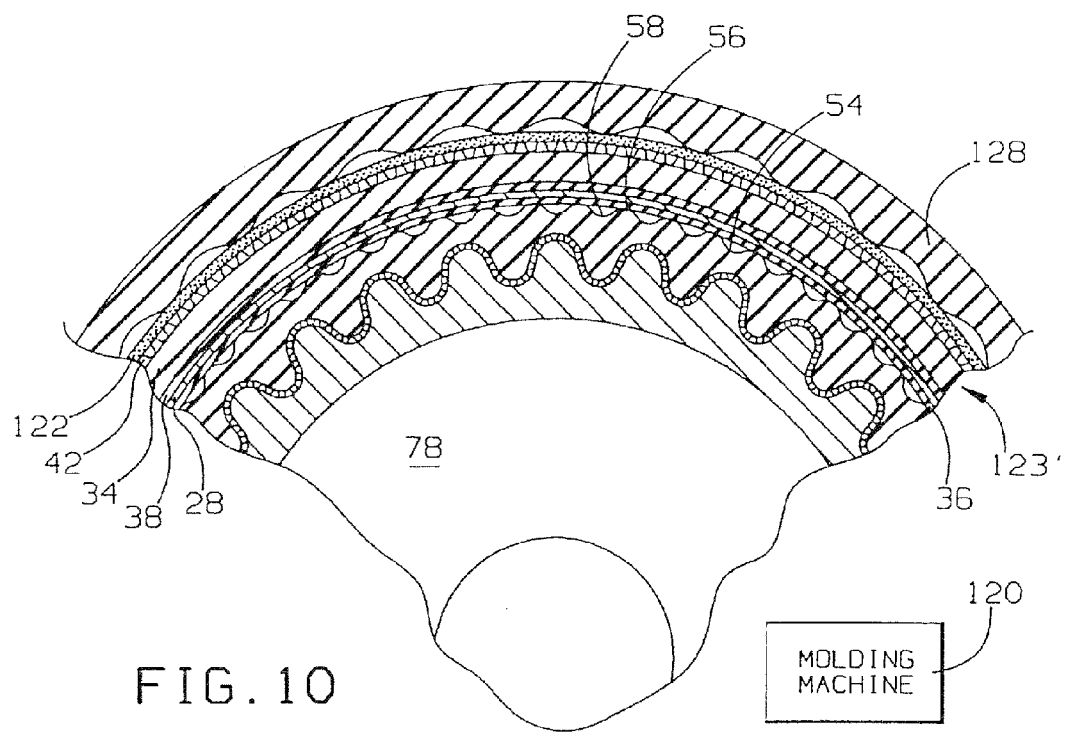
FIG. 10 is a view as in FIG. 9 showing an alternative step wherein protrusions/recesses of unacceptable dimension between the inside and outside on the first rubber layer are flattened.

In the event that the height pattern for the protrusions 56 exceeds the aforementioned 2.5 mm dimension, a modified form of the inventive method is carried out, as described with reference to FIG. 10. The shaping mold 78 is attached to the molding machine 120. The inner layer portion 36 is wrapped against the outwardly facing surface 54 of the rubber layer 32. Thereafter, the load carrying cord 28 spirally wrapped, followed by the application of the outer layer portion 38, the tension rubber layer 34, the reinforcing cloth layer 42 and the air vent member 122, to produce a sleeve preform 123'. As shown in FIG. 2, the inner layer portion 36 of the cushion rubber layer 30 becomes intimately conformed to the pattern of protrusions 56, 58 on the outwardly facing surface 54 of the rubber layer 32. This construction affords a more positive adherence of the inner layer portion 36 and the rubber layer 32, thereby contributing to a lengthened anticipated belt life. The air vent member 122, in this and the previously described embodiment, is not a requirement. The air vent member 122 wrapped around the reinforcing cloth layer 42 allows the air to escape and improves the air flow during the formation of the teeth 44. This may account for more precisely configured teeth 44.

The shaping mold 78 is then transferred to a vulcanizer in which vulcanization is carried out in conventional manner. After vulcanization, the cylindrical matrix 128, and then the preform 123', are separated from the shaping mold 78.

The belt sleeve preform 123, 123' is then attached to a mantel (not shown) and cut angularly to a predetermined width by a cutter (not shown) to produce individual belts 10.

The belt sleeve preforms 123, 123' may alternatively be cut at right angles at a predetermined width to produce belts with a rectangular cross-sectional configuration. The individual belt preforms may be attached to a two-axle pulley (not shown) to be bias cut at the side surface portions 70, 72 using a pair of cutters (not shown) between which the belt is rotated to remove ring chips to thereby finish the individual belts.

Another form of the invention will now be described to produce the power transmission belts 10, 10'. In this method, the cloth layer 40 is embossed on the shaping mold 78, as previously described.

Figure 11:
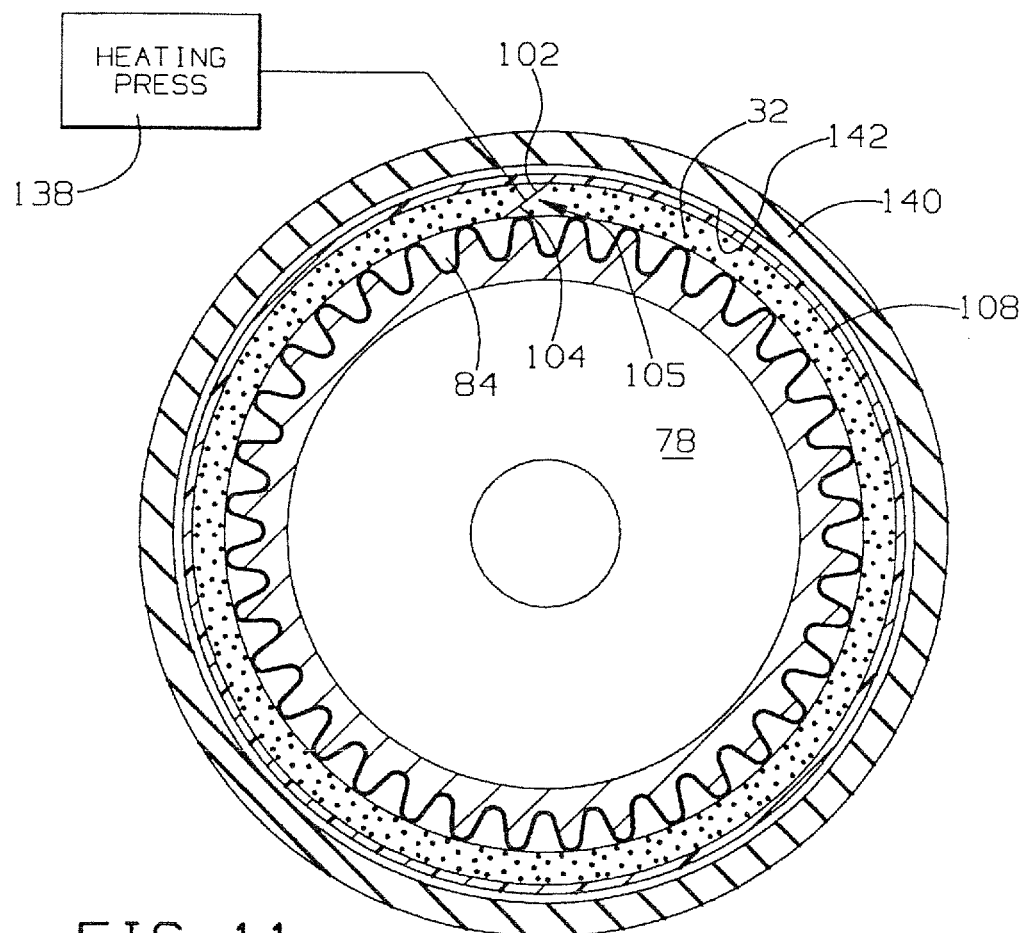
FIG. 11 is a view corresponding to that in FIG. 6 wherein the first rubber layer is situated preparatory to being conformed to the projections and recesses on the shaping die/mold using a shaping member without protrusions and recesses as would produce complementary protrusions/recesses on the side opposite where the teeth/troughs are formed.

As shown in FIG. 11, the compression rubber layer 32, in sheet form, is wrapped around the shaping mold 78, with the ends 102, 104 connected to produce the aforementioned joint 105. The joint 105 is maintained, as previously described, by controlled heating and pressurization using a heating press 138. The heating and pressurization may be carried out at a temperature of 80 to 120° C. with a contact pressure of 1 to 2 k/cm² for 10 to 30 seconds. As in the prior embodiment, the joint 105 is preferably situated at a recess 84, 84' so as not to reside at a trough 46, 46' on a completed belt 10, 10'.

The releasing sheet/layer 108 is applied over the rubber layer 32 preparatory to the embossment process and prior to the application of the rubber layer 32. The releasing sheet/layer 108 is covered by a rubber jacket 140, which serves as a steam cut-off member. The rubber jacket 140 has a flat, radially inwardly facing surface 142. With the rubber layer 32 applied to the shaping mold 78, and the rubber jacket 140 placed therearound, formation of the rubber layer 32 is carried out in the vulcanizer for approximately 5-10 minutes at a temperature of 160 to 180° C. at an external pressure of 0.8 to 0.9 MPa.

Figure 12:
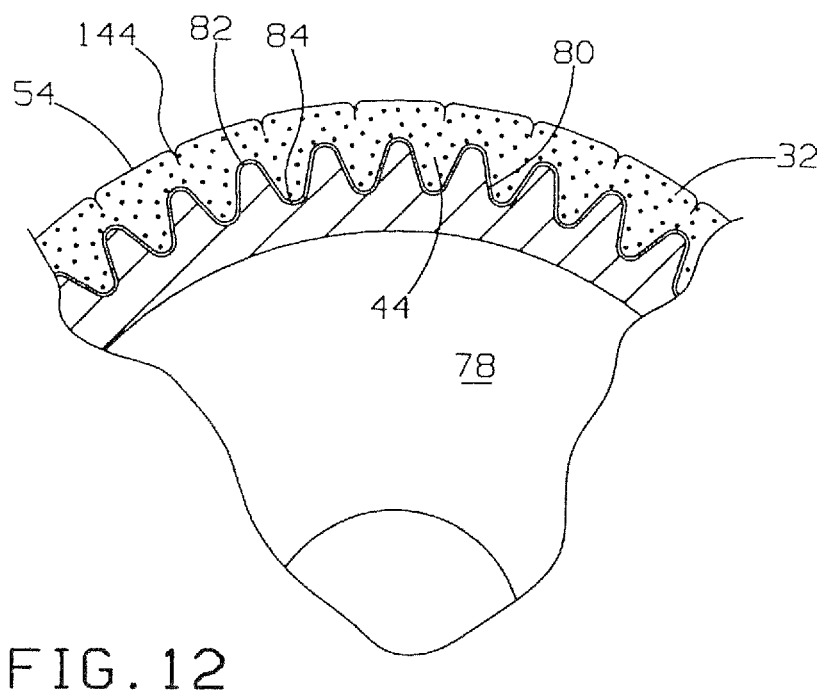
FIG. 12 is a view corresponding to that in FIG. 11 wherein the shaping member is removed and indentations/discrete holes are present.

At the conclusion of this process, the rubber layer 32 is formed as shown in FIG. 12. The rubber layer 32 is unvulcanized and is formed so as to conform to the surface 80 complementarily to the projections 82 and recesses 84 thereon. By reason of carrying out the embossment in a vulcanizer, breakage at the joint 105 is unlikely to occur. Embossment could be carried out without using a vulcanizer, as by heating and pressurizing the outside of the rubber layer 32 as by a pressurizing band, a press system, etc., as previously noted.

As seen in FIG. 12, as the rubber layer 32 flows to conform to the surface 80 of the shaping mold 78, the rubber tends to fold into the recesses 84, thereby producing relatively deep indentations 144 through the outwardly facing surface 54 of the rubber layer 32, coinciding circumferentially with the deepest portion of the teeth 44. In FIG. 12, the rubber layer 32 is shown without the use of a releasing sheet/layer 108.

Figure 13:
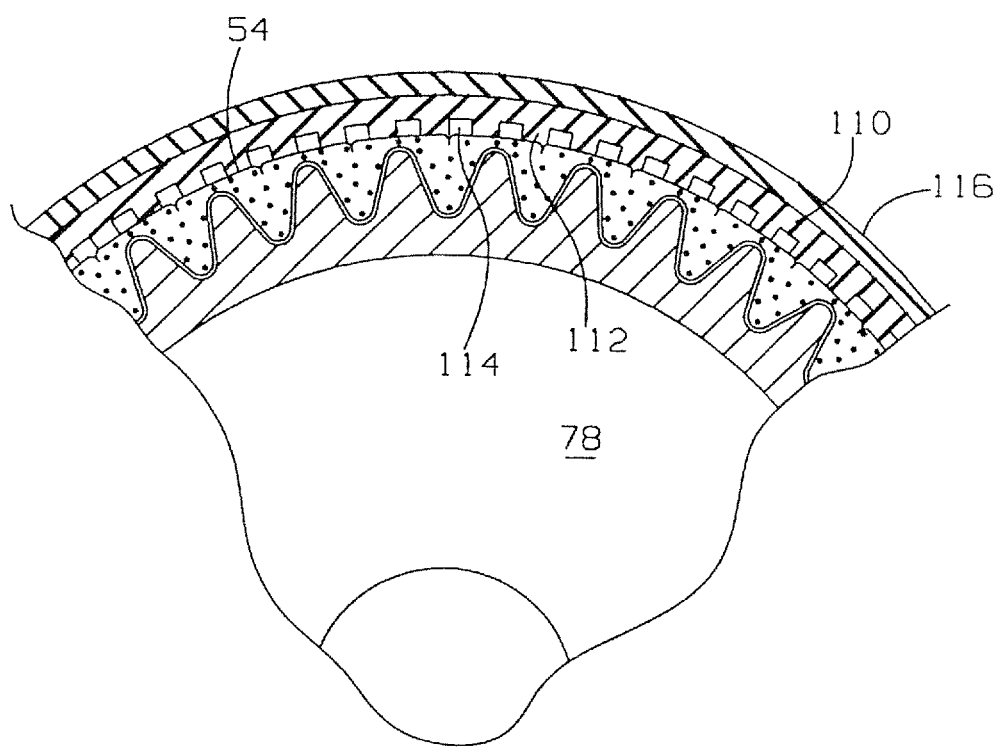
FIG. 13 is a view as in FIG. 12 wherein a shaping member that has alternating protrusions and recesses is placed over the components in FIG. 12 to eliminate the indentations/discrete holes under an applied pressure.

In the event that the rubber layer 32 is left in the FIG. 12 state, the indentations produce discrete holes, such as pin holes of the type that which cracking is prone to begin. To avoid this condition, and without requiring removal of any of the material of the rubber layer 32, the aforementioned pressing member 110 is placed around the rubber layer 32 in the FIG. 12 state, as shown in FIG. 13. The rubber jacket 116 in turn is placed around the pressing member 110.

The shaping mold 78, with the components shown in FIG. 13, is then placed in a vulcanizer. Through the protrusions 112, as in the prior embodiment, the outwardly facing surface 54 is locally pressed/pressurized at the teeth 44 and particularly in the vicinity of the indentations 144 for approximately 5-10 minutes under controlled temperature and pressure conditions. Preferably, the temperature is maintained at 160 to 180° C. with an external pressure of 0.1 to 0.9 MPa to compressibly eliminate the indentations 144, thereby attaining an outwardly facing surface 54 without discrete holes of the type at which cracks are prone to being generated. With this, and other embodiments, the elimination of discrete holes, and controlling of the interface between the cushion rubber and compression rubber layers, also maintain the load carrying member(s)/cord(s) consistently aligned, which also contributes to a longer belt life.

As an alternative to using the pressing member 110, with or without the rubber jacket 116, a toothed belt, or rubber jacket having protrusions and grooves on the inner surface thereof, may be used.

At the conclusion of the process, alternating protrusions 56 and recesses 58 are formed in the outwardly facing surface 54 in the same manner as are formed using the previously described method. It is preferred that the height of the protrusions be maintained between 0.2 to 2.5 mm for reasons previously stated. As in the prior embodiment, when the difference exceeds 2.5 mm, it is necessary to flatten the outwardly facing surface 54. If the difference is less than 0.2 mm, the indentations 144 may not be altered sufficiently to eliminate discrete holes that may be the source of crack generation and may lead to premature failure.

If it becomes necessary to flatten the protrusions 56, the rubber layer 32 may be covered with a cylindrical jacket 118, previously described, whereupon the structure is placed in a vulcanizer and pressurized for approximately 5 to 10 minutes at a temperature of 160 to 180° C. at an external pressure of 0.8 to 0.9 MPa.

The resulting structure is then cut to predetermined widths to produce completed belts or belt preforms that may be subsequently further processed.

In all embodiments, described above, discrete holes at the interface between a compression rubber layer and cushion rubber layer can be eliminated, or prevented, in the tooth region without generation of scrap, such as cutting, grinding, or polishing chips.

Different belts, made according to the present invention, will now be described.

Example 1

For the load carrying cords, aramid fibers (trade name: TWARON™) of 1,500 denier were twisted in opposite directions with an upper twist number of 19.7 times per 10 cm and a lower twist number of 15.8 times per 10 cm to attain a 2×3 twist structure. The resulting unprocessed cords had a total denier of 9,000. Next, the unprocessed cords were pre-dipped in an isocyanate-type adhesive, and then dried at a temperature of approximately 170 to 180° C. They were then immersed in an RFL liquid and subjected to stretch thermofixation treatment at a temperature of 200 to 240° C. to thereby produce processed cords.

For the reinforcing cloth, a wide angle, plain weave canvas was used with a combined filament yarn consisting of aramid fiber (trade name: TWARON™) and polyethylene terephthalate fiber in a proportion by weight of 50:50. The canvas was immersed in an RFL liquid, and then subjected to heat treatment at 150° C. for two minutes to produce a processed canvas. Thereafter, the processed canvas was friction coated with a rubber composition to produce a rubberized canvas.

For each of the compression rubber layer and the tension rubber layer, a rubber composition consisting of chloroprene rubber containing aramid fiber (25 parts by weight per 100 parts by weight of rubber) was used. A rubber composition consisting of chloroprene rubber, with no short fiber, was used for the cushion rubber layer.

A shaping mold with a circular section, to which a cylindrical matrix equipped with alternating protrusions and recesses was attached, was installed on a support shaft. A rubber cement, prepared by dissolving a chloroprene rubber composition in methyl ethyl ketone, was applied by spraying on the surfaces of the protrusions. A single ply of reinforcing cloth was held between the shaping mold and a pinion roller, and was embossed, with the shaping mold and pinion roller rotated in mesh with each other.

Subsequently, a compression rubber sheet with its end surfaces bias cut was wrapped around the reinforcing cloth on the shaping mold. Its end surfaces were abutted at a joint. After lightly securing the joint by a stitcher, bonding was further effected by using a heating press at a temperature of 100° C., at a contact pressure of 1 to 2 kg/cm$^2$ for 15 seconds.

Thereafter, one ply of a polyethyl pentene film/releasing member, with a thickness of 0.05 mm, was wrapped around the surface of the compression rubber sheet. The thus assembled components were surrounded by a pressing member, in the form of a wide toothed S3M belt having alternating protrusions and recesses/grooves. The outer side thereof was covered with a rubber jacket before being placed in a vulcanizer. Embossment was effected on the compression rubber sheet by the protrusions and grooves/recesses for approximately seven minutes at a temperature of 170° C. and an external pressure of 0.8 MPa, to thereby produce an unvulcanized sleeve, with the compression layer thereon having an outer surface without any discrete holes. Further, load carrying cords, a cushion rubber layer, a tension rubber layer, and a reinforcing cloth layer were successively wrapped around the outside surface of the unvulcanized compression rubber layer, to prepare a belt preform, which was placed in a vulcanizer after successively covering it with a cylindrical matrix, equipped with alternating protrusions and recesses, and a jacket. Vulcanization was carried out under ordinary conditions. The resulting sleeve was cut in a "V" shape by a cutter to finish it as a toothed/cogged belt for a scooter.

The interface between the compression rubber layer and the inside of the cushion rubber layer of the resulting belt was flat without any protrusions or recesses. The inside of the cushion rubber layer did not migrate into the teeth and the thickness of the inside portion of the cushion rubber layer was substantially uniform over the entire periphery of the belt. Further, since the compression rubber layer was filed with the rubber composition, no generation of discrete holes, such as pin holes, was observable to the naked eye.

Example 2

The same load carrying cords, reinforcing cloth, compression rubber layer, tension rubber layer, and cushion rubber layer as those of Example 1 were used. Embossment was performed on the reinforcing cloth by the shaping mold as in Example 1. The compression rubber sheet was wrapped around the reinforcing cloth on the shaping mold, and then one ply of a releasing sheet/layer, with a thickness of 0.05 mm, was wrapped therearound.

The outer side of the releasing sheet was surrounded by a rubber matrix in the form of a wide toothed belt having alternating teeth and protrusions/recesses. The outer side thereof was covered with a rubber jacket, similar to the one described above. The shaping mold, with the components built up thereon, was placed in a vulcanizer. The outside surface of the compression layer was locally pressurized for approximately seven minutes at a temperature of 170° C. and at an external pressure of 0.8 MPa to thereby attain a state wherein there were no discrete holes thereat. The outside surface of the compression layer had a protrusion/recess pattern with a protrusion height of approximately 3 mm.

This entire assembly was covered with a rubber jacket and placed in a vulcanizer and treated for approximately seven minutes at a temperature of 170° C. and an external pressure of 0.8 MPa. This resulted in the back surface of the sleeve being finished as substantially a flat surface with no appreciable protrusion/recess pattern. At this stage, the compression rubber layer was unvulcanized.

Further, as in Example 1, the load carrying cords, the cushion rubber sheet, the tension rubber sheet, and the reinforcing cloth layer were successively wrapped around the compression rubber layer to produce a belt sleeve preform, which was thereafter successively covered with a cylindrical matrix, having alternating protrusions and grooves/recesses, and a jacket. This entire assembly was installed in a vulcanizer, where vulcanization was effected under ordinary conditions. The preform was then cut in "V" shapes by a cutter to define individual toothed/cogged belts for a scooter.

At the teeth, the interface between the compression rubber layer and the lower cushion rubber layer portion of each belt was a substantially flat surface without any appreciable protrusions or recesses. The inner cushion rubber layer portion did not migrate into the teeth and the thickness of the inner cushion rubber layer was substantially uniform over the entire length of the belt. Further, since the compression rubber layer was filled with the rubber composition, no generation of discrete holes, such as pin holes, was observable to the naked eye.

Example 3

As in Example 2, an unvulcanized compression layer, having an outer surface with a protrusion/recess pattern whose difference in height was approximately 3 mm and a cog portion, was produced.

Further, an inner cushion rubber sheet portion, load carrying cords, an outer cushion rubber sheet portion, a tension rubber sheet a reinforcing cloth, and an air vent member were successively wrapped around the back surface of the unvulcanized compression rubber layer to prepare a belt sleeve preform. The preform was cut in "V" shapes by a cutter to finish it as a toothed/cogged belt for a scooter.

The interface at the teeth between the compression rubber layer and the inner cushion rubber layer portion of the resulting belts was a surface with a protrusion/recess pattern. The inner cushion rubber layer portion was in conforming, intimate contact with the protrusion/recess pattern on the surface of the shaping mold. Since the interface between the compression rubber layer and the inner cushion rubber layer was filled with the rubber composition, no generation of discrete holes, such as pin holes, was observable to the naked eye.

Example 4

For the load carrying cords, aramid fibers (trade name: TWARON™) of 1500 denier were twisted in opposite directions with an upper twist number of 19.7 times per 10 cm and a lower twist number of 15.8 times per 10 cm to attain a 2×3 twist structure. The resulting, unprocessed cords each had a total denier of 1,000. The unprocessed cords were pre-dipped in an isocyanate-type adhesive, and then dried at a temperature of approximately 170 to 180° C. They were then immersed in an RFL liquid, and were subjected to stretch thermofixation treatment at a temperature of 200 to 240° C. to thereby produce processed cords.

A wide angle plain weave canvas, using a combined filament yarn consisting of aramid fiber (trade name: TWARON™) and polyethylene terephthalate fiber, in a proportion by weight of 50:50, was used for the reinforcing cloth layer/canvas. The canvas was immersed in an RFL liquid, and then subjected to heat treatment at 150° C. for two minutes to prepare a processed canvas. Thereafter, the processed canvas was friction coated with a rubber composition.

For each of the compression rubber and tension rubber layers, a rubber composition consisting of chloroprene rubber containing aramid fiber (25 parts by weight per 100 parts by weight of rubber) was used. For the cushion rubber layer, a rubber composition consisting of chloroprene rubber, with no short fiber therein, was used.

A shaping mold, with a circular section upon which a cylindrical matrix having alternating projections and recesses was placed, was attached to a support shaft. A rubber cement, prepared by dissolving a chloroprene rubber composition in methyl ethyl ketone, was applied by spraying the surfaces of the projections. The reinforcing cloth was placed between the shaping mold and a pinion roller. A single ply was embossed by the shaping die and the pinion roller that were rotated in mesh with each other.

A compression rubber sheet with its ends bias cut was wrapped around the reinforcing cloth on the shaping mold, and its ends abutted to produce a joint. After lightly joining the ends by a stitcher, bonding was enhanced by using a heating press at a temperature of 100° C. with a contact pressure of 1 to 2 kg/cm$^2$ for 15 seconds.

Thereafter, one ply of a polyethyl pentene releasing member/film, with a thickness of 0.05 mm, was wrapped around the outer surface of the compression rubber layer. This structure was covered with a rubber jacket and placed in a vulcanizer. Embossment of the compression rubber layer was effected by the projections and recesses of the cylindrical matrix for approximately seven minutes at a temperature of 170° C. at an external pressure of 0.8 Mpa.

The outer side of the releasing member was surrounded by a pressing member, in the form of a wide toothed S3M belt having alternating teeth/projections and grooves/recesses. The outer side thereof was covered with a rubber jacket before being placed in a vulcanizer. The back surface of the compression layer was locally pressurized for approximately seven minutes at a temperature of 170° C. and an external pressure of 0.8 MPa. The indentations in the surface of the compression layer were thereby eliminated to produce an interface surface with no discrete holes.

Then, load carrying cords, a cushion rubber sheet, a tension rubber sheet, and a reinforcing cloth layer were successively wrapped around the back surface of the unvulcanized compression rubber layer, to define a belt sleeve preform, which was covered with a cylindrical matrix having alternating protrusions and recesses, and then a jacket. The resulting assembly was placed in a vulcanizer, where vulcanization was performed under ordinary conditions to obtain a belt sleeve preform. This sleeve preform was cut in "V" shapes by a cutter to finish the same as toothed/cogged belts for a scooter.

The interface at the teeth between the compression rubber layer and the inner cushion rubber layer portion of the resulting belts was a substantially flat surface without any appreciable protrusions or recesses. The cushion rubber layer did not migrate into the teeth, and the thickness of the inner cushion rubber layer portion was substantially uniform over the entire periphery of the belt. Further, since the compression rubber layer was filled with the rubber composition, no discrete holes, such as pin holes, were observable to the naked eye.

The foregoing disclosure of specific embodiments is intended to be illustrative of the broad concepts comprehended by the invention.

The invention claimed is:

1. A power transmission belt comprising:
a body with an inside, an outside, and a length,
the body having a tension section and a compression section between which there is at least one load carrying member,
the body having teeth and troughs alternating lengthwise of the body,
a rubber layer making up a part of the body in which the teeth are formed having a surface facing in one of an inside and outside direction on which alternating protrusions and recesses are formed against which another component on the body is placed,
the teeth each having a lengthwise dimension,
each tooth in a plurality of the teeth having a plurality of the protrusions and a plurality of the recesses within its lengthwise dimension,
the plurality of teeth residing in one of the tension and compression sections,
the plurality of protrusions residing in the one of the tension section and compression section in which the plurality of teeth reside.

2. The power transmission belt according to claim 1 wherein the protrusions and recesses each has a lengthwise dimension that is substantially less than the lengthwise dimension of the teeth and the teeth are formed on the layer at a surface on the layer facing oppositely to the surface on the layer facing in the one of an inside and outside direction.

3. The power transmission belt according to claim 1 wherein the protrusions have a dimension between the inside and outside of the body between 0.2 and 2.5 mm.

4. The power transmission belt according to claim 1 wherein the another component comprises a cushion rubber layer in which the at least one load carrying member is embedded and conforms to the surface facing in the one of the inside and outside directions.

5. The power transmission belt according to claim 4 wherein the teeth are formed in the compression section.

6. The power transmission belt according to claim 5 wherein there are teeth and troughs alternating in a lengthwise direction and formed in the tension section.

7. The power transmission belt according to claim 1 wherein the another component placed against the layer conforms to the recesses and protrusions and the recesses and protrusions are formed before the another component is placed.

8. The power transmission belt according to claim 1 wherein the surface has a sinusoidal shape.

9. A power transmission belt comprising:
a body with an inside, an outside, and a length,
the body having a tension section and a compression section,
the body having teeth and troughs alternating lengthwise of the body,
a first layer on the body having oppositely facing first and second surfaces,
the teeth and troughs formed at the first surface by applying pressure to the layer against a mold surface to cause the first surface to conform to a mold surface that has a shape complementary to the teeth and troughs,
the second surface formed with a non-flat shape through pressure application at the second surface,
the body further comprising a component that is placed directly against the second surface of the first layer with the non-flat shape pre-formed, formation of the second surface of the first layer eliminating discrete holes at the teeth, generated by conforming of the first layer to a mold surface into which the component is directed.

10. The power transmission belt according to claim 9 wherein the component comprises a cushion rubber layer in which a load carrying member extending lengthwise of the body is embedded.

11. The power transmission belt according to claim 10 wherein the teeth are in the compression section.

12. The power transmission belt according to claim 9 wherein the second surface on the first layer has alternating protrusions and recesses to which the component conforms.

13. The power transmission belt according to claim 12 wherein the teeth have a lengthwise dimension and the protrusions have a lengthwise dimension that is substantially less than the lengthwise dimension of the teeth.

14. The power transmission belt according to claim 13 wherein the protrusions have a dimension between the inside and outside of the body between 0.2 and 2.5 mm.

15. The power transmission belt according to claim 9 wherein the second surface has a sinusoidal shape.

16. A power transmission belt comprising:
a body with an inside, an outside, and a length,
the body having a tension section and a compression section,
the body having teeth and troughs alternating lengthwise of the body,
a rubber layer making up a part of the body in which the teeth are formed having a surface facing in one of an inside and outside direction on which alternating protrusions and recesses are formed against which another component on the body is placed and conforms,
the layer having a surface facing in the other of the inside and outside direction at which the teeth and troughs are formed,
wherein the another component comprises a cushion rubber layer in which a load carrying member is embedded,
wherein the teeth are formed in the compression section,
wherein the surface facing in one of an inside and outside direction is located in the compression section.

17. The power transmission belt according to claim 16 wherein the teeth have a lengthwise dimension and the protrusions have a lengthwise dimension that is substantially less than the lengthwise dimension of the teeth.

18. The power transmission belt according to claim 16 wherein the protrusions have a dimension between the inside and outside of the body between 0.2 and 2.5 mm.

19. The power transmission belt according to claim 16 wherein there are teeth and troughs alternating in a lengthwise direction and formed in the tension section.

20. The power transmission belt according to claim 16 wherein the recesses and protrusions are formed before the another component is placed.

* * * * *